United States Patent
Oren-Pines et al.

(10) Patent No.: US 12,176,948 B2
(45) Date of Patent: *Dec. 24, 2024

(54) WIRELESS COMMUNICATION MODULES FOR STREET LAMPS

(71) Applicant: Legasus Networks, Inc., San Jose, CA (US)

(72) Inventors: Yaron Oren-Pines, San Jose, CA (US); Douglas J. Lee, San Jose, CA (US); Thao Tran, Milpitas, CA (US)

(73) Assignee: Legasus Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/221,639

(22) Filed: Jul. 13, 2023

(65) Prior Publication Data

US 2024/0120999 A1  Apr. 11, 2024

Related U.S. Application Data

(63) Continuation of application No. 17/565,480, filed on Dec. 30, 2021, now Pat. No. 11,716,142, which is a continuation of application No. 16/839,084, filed on Apr. 3, 2020, now abandoned, which is a continuation of application No. 14/740,504, filed on Jun. 16, 2015, now Pat. No. 10,623,096.

(60) Provisional application No. 62/015,017, filed on Jun. 20, 2014.

(51) Int. Cl.
*H04B 10/116* (2013.01)
*H04B 10/27* (2013.01)
*H04W 84/18* (2009.01)

(52) U.S. Cl.
CPC ......... *H04B 10/116* (2013.01); *H04B 10/27* (2013.01); *H04W 84/18* (2013.01); *Y10T 29/49004* (2015.01)

(58) Field of Classification Search
None
See application file for complete search history.

(56) References Cited

U.S. PATENT DOCUMENTS

| | | | | |
|---|---|---|---|---|
| 11,716,142 B2 * | 8/2023 | Owen-Pines | ........ | H04B 10/116 398/115 |
| 2008/0289870 A1 * | 11/2008 | Butler | ...................... | H02G 3/38 174/45 R |
| 2010/0141153 A1 * | 6/2010 | Recker | ................. | H05B 45/357 315/149 |
| 2012/0310703 A1 * | 12/2012 | Cavalcanti | .............. | H04W 4/38 705/7.29 |

(Continued)

*Primary Examiner* — David W Lambert
(74) *Attorney, Agent, or Firm* — Alford Law Group, Inc.; William E. Alford

(57) ABSTRACT

A robust wireless communications network is deployed by retrofitting spatially distributed light sockets with integrated light/communicator modules. Each light/communicator module comprises an electric lamp and a communicator unit, the communicator unit having an RF transceiver, an antenna, and a Broadband processor for communicating with other nodes in the wireless communication network, using a suitable mesh network protocol. A power conversion unit is optionally provided in each integrated light/communicator module so that the individual components of the module may operate on the standard light socket power or selectably from other power sources.

17 Claims, 7 Drawing Sheets

(56) References Cited

U.S. PATENT DOCUMENTS

2015/0270897 A1\* 9/2015 Sackman ............. H04B 10/118
398/125

\* cited by examiner (Background)**

WIRELESS COMMUNICATION MODULES FOR STREET LAMPS

CROSS-REFERENCE TO RELATED APPLICATIONS

This application is a continuation and claims priority to U.S. patent application Ser. No. 17/565,480, titled STREET LAMPS WITH WIRELESS COMMUNICATION MODULES filed on Dec. 30, 2021, by inventors Yaron Oren-Pines et al., now allowed to issue on Aug. 1, 2023, as U.S. patent Ser. No. 11/716,142. U.S. patent application Ser. No. 17/565,480 is a continuation and claims priority to U.S. patent application Ser. No. 16/839,084 titled STREET LAMPS WITH INTEGRATED LIGHT/COMMUNICATOR MODULES filed on Apr. 3, 2020, by inventors Yaron Oren-Pines et al., now abandoned. U.S. patent application Ser. No. 16/839,084 is a continuation and claims priority to U.S. patent application Ser. No. 14/740,504; filed Jun. 16, 2015 by inventors Yaron Oren-Pines et al.; titled DEPLOYMENT OF A WIRELESS COMMUNICATION NETWORK BY RETROFITTING SPATIALLY DISTRIBUTED ELECTRIC LAMPS WITH INTEGRATED LIGHT/COMMUNICATOR MODULES; now issued as U.S. Pat. No. 10,623,096 on Apr. 14, 2020. U.S. patent application Ser. No. 14/740,504 claims priority to U.S. Provisional Application No. 62/015,017, filed Jun. 20, 2014 by inventors Yaron Oren-Pines et al.; titled DEPLOYMENT OF A WIRELESS COMMUNICATION NETWORK BY RETROFITTING SPATIALLY DISTRIBUTED ELECTRIC LAMPS WITH INTEGRATED LIGHT/COMMUNICATOR MODULES; which is incorporated herein by reference for all intents and purposes.

FIELD

The embodiments disclosed generally relate to wireless communication networks.

BACKGROUND

One type of wireless communication network is a wireless mesh network. The wireless mesh network is a network made up of Radio Frequency (RF) transceivers organized in a mesh topology. Wireless mesh networks may consist of mesh clients, mesh routers and mesh gateways. Clients can be computer nodes, cell phones and other devices and a mesh router forwards traffic to and from gateways which may or may not be connected to the Internet. A mesh network offers redundancy in that when one node is inoperative, other nodes can still communicate with each other either directly or through intermediate nodes.

An emergency communication network comprising mobile devices is typically of limited size and range. One example of such a network is a Mobile Ad Hoc Network (MANET), which is a continuously self-configuring, infrastructure independent network of mobile devices connected without wires. To provide mission-critical communications, the emergency communication network should have an (i) infrastructure that is resilient, redundant, and highly available; (ii) communications should be reliable; (iii) communications should be secure; and (iv) point-to-multipoint communication should be supported. The mission-critical communications may include both mission-critical voice and mission critical data.

According to the National Public Safety Telecommunications Council (NPSTC), mission-critical voice communications should provide the following features:

Direct or Talk Around: This mode of communications provides public safety with the ability to communicate unit-to-unit when out of range of a wireless network OR when working in a confined area where direct unit-to-unit communications is required.

Push-to-Talk (PTT): This is the standard form of public safety voice communications today—the speaker pushes a button on the radio and transmits the voice message to other units. When they are done speaking they release the Push-to-Talk switch and return to the listen mode of operation.

Full Duplex Voice Systems: This form of voice communications mimics that in use today on cellular or commercial wireless networks where the networks are interconnected to the Public Switched Telephone Network (PSTN).

Group Call: This method of voice communications provides communications from one-to-many members of a group and is of vital importance to the public safety community.

Talker Identification: This provides the ability for a user to identify who is speaking at any given time and could be equated to caller ID available on most commercial cellular systems today.

Emergency Alerting: This indicates that a user has encountered a life-threatening condition and requires access to the system immediately and is, therefore, given the highest level or priority.

Audio Quality: This is a vital ingredient for mission critical voice. The listener must be able to understand without repetition, and can identify the speaker, can detect stress in a speaker's voice, and be able to hear background sounds as well without interfering with the prime voice communications.

Mission-critical data or intelligence information delivered to emergency responders on a reliable, secure IP-based emergency communication network with high speed performance. In particular, it provides emergency responders with information that assists them in doing their jobs. It allows mobile device users who are connected through the emergency communication network to wirelessly interrogate databases to gather useful information and to send or receive critical information to other mobile device users in the form of data. When a control room is connected to the emergency communication network, mission-critical broadband data may also be pro-actively sent or received by control room staff to emergency responders such as police officers, firefighters, and paramedics.

Wireless Internet access is commonly provided to mobile devices through cellular services and localized WiFi hotspots. However, access to WiFi and cellular networks is not available at all locations and expanded coverage to those locations may require the deployment of additional Cell Towers and raise environmental concerns. Likewise, access to a localized WiFi hotspot is not available at all locations and even when available at a current location of the mobile device, require continuous scanning for alternative WiFi hotspots and connections to another found WiFi hotspot to accommodate movement of the mobile device.

A wireless communication network which is to be deployed over a large geographical area generally requires a number of spatially distributed nodes for relaying communications between distant nodes in the network. Where the deployment of such a wireless communication network, however, spans an area such as an entire city, the component and installation costs of the network may be very large. Also, difficulties may arise in finding suitable locations for installing the nodes and procuring the necessary permissions to install the nodes at those locations. Also, there is often public objection to typical wireless network deployments which are bulky, unsightly, and/or have environmental concerns (e.g., EMI, noise emission).

BRIEF SUMMARY

The embodiments are summarized by the claims that follow below.

DETAILED DESCRIPTION

A wireless communication network is deployed by retrofitting spatially distributed electric lamps with integrated light/communicator modules. The electric lamps may be incandescent, fluorescent, halogen, Light Emitting Diode (LED), Compact Fluorescent (CFL), High Pressure Sodium (HPS), or any other electric lamp that is replaceable by being removed from and inserted into a light socket for electrical connection to a power source. The power source may be an Alternating Current (AC) power source or a Direct Current (DC) power source. Each electric lamp may be a component of a stationary lighting device or a mobile lighting device. Examples of stationary lighting devices include street lamps, household or office lamps, and night lights. An example of a mobile lighting device is a flashlight.

Figure 1:
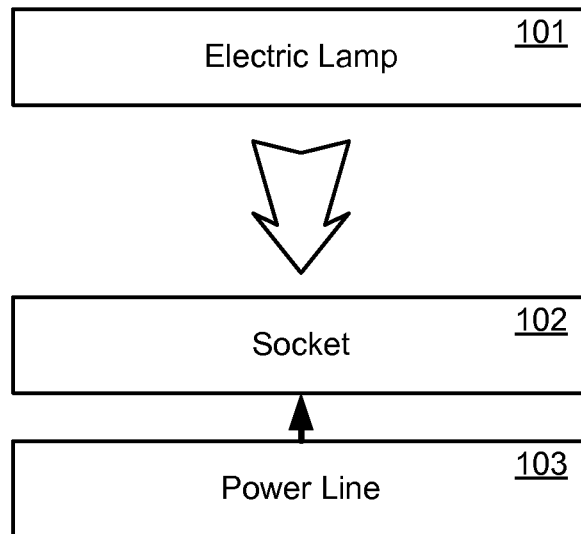
FIG. 1 illustrates a block diagram of a prior art lighting device.
Figure 2:
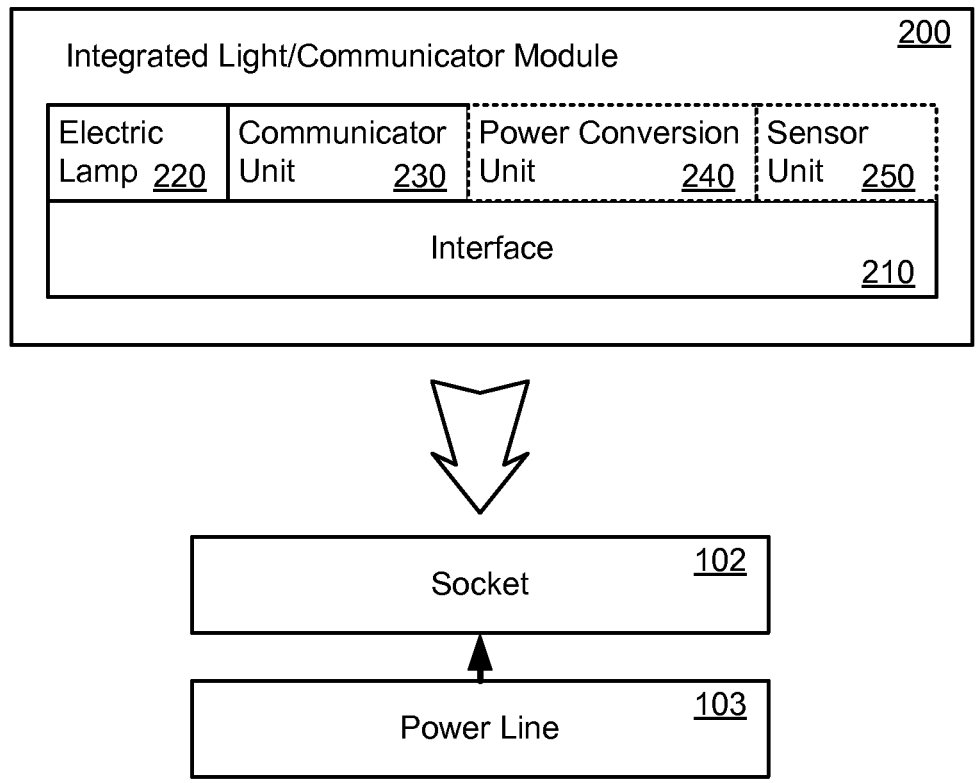
FIG. 2 illustrates a block diagram of a lighting device including an integrated light/communicator module utilizing aspects of the present invention.

FIG. 1 illustrates a lighting device in which a standard electric lamp 101 is insertable in a conventional manner into a light socket 102 for electrical connection to a power line 103. In contrast, FIG. 2 illustrates an integrated light/communicator module 200, of the present invention, that is insertable instead into the socket 102 for electrical connection to the power line 103. Examples of the socket 102 include a base for a light bulb, a mounting hole for a street light fixture, and a single contact, or double contact, or 4-pin contact, etc. for a fluorescent light. As used herein, the term "socket" means any structure used to electrically connect the electric lamp 101 to the power line 103. Although the integrated light/communicator module 200 is shown and described as being separate from the socket 102 herein, it is to be appreciated that the integrated light/communicator module 200 may include all or part of the socket 102 in various embodiments of the present invention. In embodiments where the integrated light/communicator module 200 includes the socket 102, the phrase "inserting the integrated light/communicator module into the socket" is understood to mean electrically coupling the integrated light/communicator module to the power line.

The integrated light/communicator module 200 is packaged so as to replace the standard electric lamp 101, in form, fit, and lighting function. The light/communicator module 200 includes an interface 210, an electric lamp 220, and a communicator unit 230. Optionally includable is a power conversion unit 240 and sensor unit 250. The electric lamp 220 is preferably an energy efficient electric lamp, such as an LED or CFL. Alternatively, the electric lamp 220 may be the standard electric lamp 101 or a functional equivalent thereof. The interface 210 provides both mechanical and electrical connectivity to the socket 102. The interface 210 also provides physical support for the electric lamp 220, communicator unit 230, power conversion unit 240, and sensor unit 250. As an example, the interface 210 includes a printed circuit board upon which other components of the integrated light/communicator module 200 may be mounted.

Figure 3:
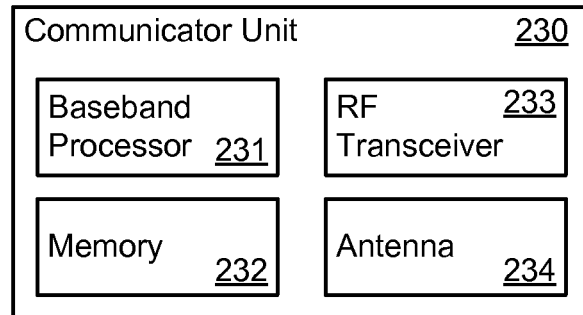
FIG. 3 illustrates a block diagram of a communicator unit included in the integrated light/communicator module utilizing aspects of the present invention.

As shown in FIG. 3, the communicator unit 230 includes a Baseband processor 231, a memory 232, an RF transceiver 233, and an antenna 234. The memory 232 is preferably a low power, non-volatile memory which stores program code to be executed by the Baseband processor 231. The program code preferably includes Software Defined Radio (SDR) coding to configure the communicator unit 230 to communicate with other nodes of the wireless communication network, using a suitable network protocol, such as a mesh network protocol, through the RF transceiver 233. In particular, the program code provides instructions to the Baseband processor 231 to cause the integrated light/communicator module 200 to function as a node of the wireless communication network. Alternatively, multiple network protocols may be supported, so that the communicator unit 230 is adapted to communicate with multiple networks having different protocols. The Baseband processor 231, the RF transceiver 233, and the antenna 234 are the core elements of the SDR. Usage of SDR allows flexibility in communication protocols and operational bands. While SDR is preferred, each integrated light/communicator module 200 can also be designed and implemented with conventional radio components and hardware/software. The communicator unit 230 may also include functionality for a wireless modem and/or wireless router, if such additional functionality is advantageous for its role in the wireless communication network. The communicator unit 230 may be implemented as a miniPCIe module, a Field Programmable Gate Array (FPGA), or a System On a Chip (SoC). Although an RF transceiver is described herein, other wireless technologies may alternatively, or additionally, be employed such as Free Space Optical (FSO) communication.

Figure 4:
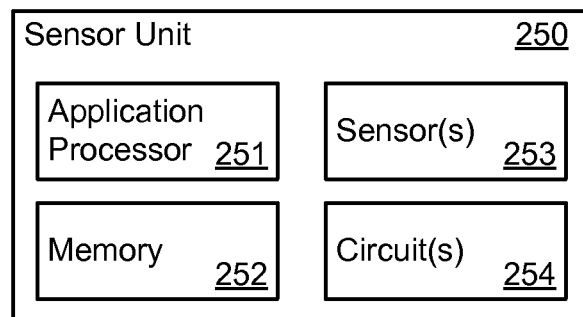
FIG. 4 illustrates a block diagram of a sensor unit included in the integrated light/communicator module utilizing aspects of the present invention.

As shown in FIG. 4, the sensor unit 250 includes an application processor 251, a memory 252, one or more sensors 253, and circuitry 254 for translating output of the sensor(s) 253 into suitable input for the application processor 251. The memory 252 is preferably a low power, non-volatile memory which stores program code to be executed by the application processor 251. The program code may perform various functions using data provided by the sensor(s) 253 to control activities of other units of the integrated light/communicator module 200 based on such sensor data.

As examples, the sensor(s) 253 may include one or more of a Global Positioning System (GPS) sensor, a vibration sensor, a light sensor, a motion sensor, a humidity sensor, a temperature sensor, video camera sensor, etc. Various combinations of these sensors could be used for a multitude of functions such as weather condition reporting, surveillance functions, video monitoring, traffic monitoring, and automated lighting control. For example, some of the sensors 253 may be used to provide information to a electric lamp controller, implemented by the application processor 251, in the integrated light/communicator module 200 to appropriately adjust the electric lamp settings for current environmental conditions as programmed by the processor 251. As another example, sensors may be provided to detect visibility issues (e.g., fire, sand, etc.) to provide information to the light unit controller to adjust, as needed, the intensity and color of the illumination of the electric lamp. In an emergency deployment scenario, the electric lamp 220 could be remotely controlled to flash or utilize maritime signaling sequences to alert personnel within the vicinity of the integrated light/communicator module 200. The lighting functionality operating in conjunction with the sensor(s) 253 and the application processor 251 can be programmed to be "self-aware." Self-aware is exemplified by functionality such as self-diagnostics, power management, bad node elimination, location, and emergency lighting. These functions may or may not be dependent on the communications backbone status of the wireless communication network in which the integrated light/communicator module 200 participates in.

Figure 5:
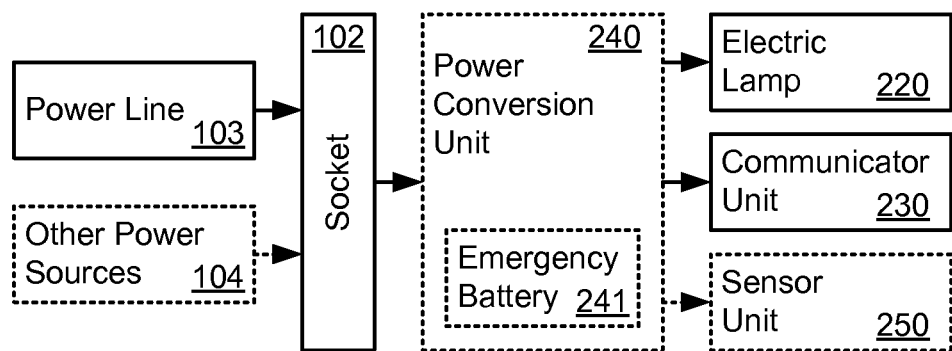
FIG. 5 illustrates a block diagram of a power conversion unit interacting with its sources of power and its recipients of converted power, as used in an integrated light/communicator module utilizing aspects of the present invention.

As shown in FIG. 5, the power conversion unit 240 converts power received from the socket 102 into suitable power levels for driving the electric lamp 220, communicator unit 230, and sensor unit 250. In addition to the power line 103, optionally other power sources 104, such as solar panels, may also provide power to the power conversion unit 240 directly or through the socket 102. The power conversion unit 240 may also be equipped with an emergency battery 241, which is to be used in the event of a power failure to the power conversion unit 240. In particular, the power conversion unit may be configured with hardware, software, or firmware which switches the power used by the module 200 from the power line 103 to the other power sources 104 when available or battery power when needed. To perform power conversion, the power conversion unit 240 includes, as required, conventional power conversion circuitry such as AC/DC converters and voltage dividers.

Figure 6:
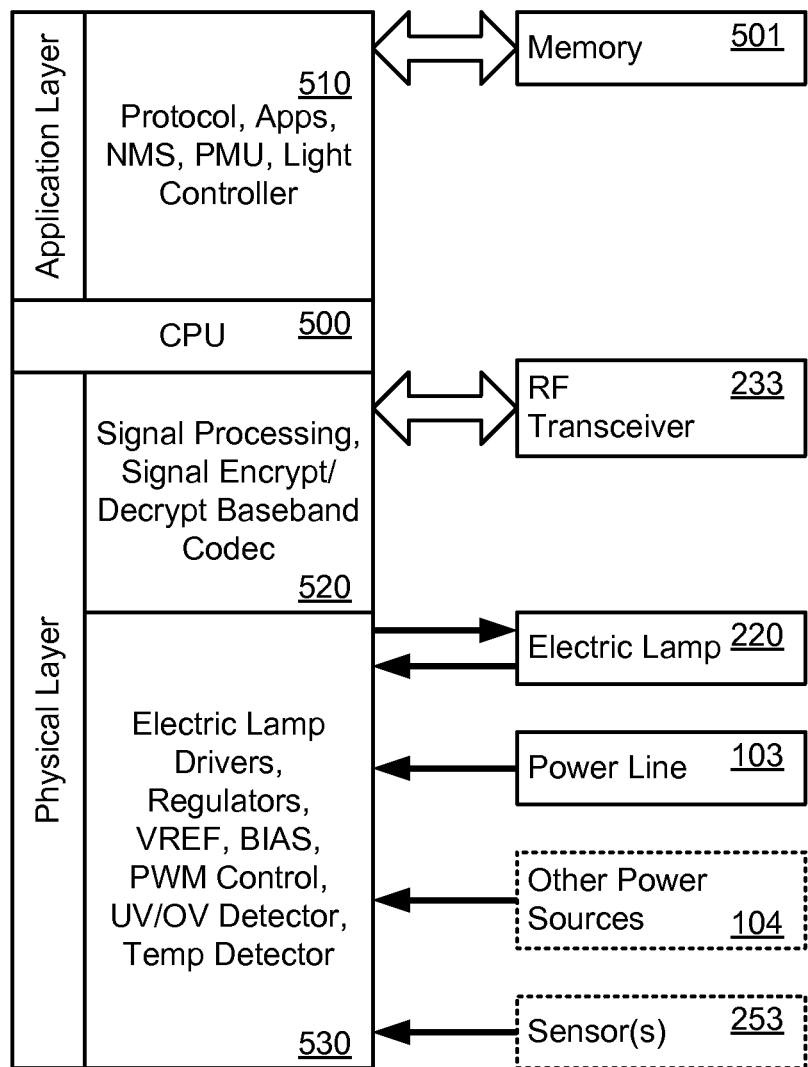
FIG. 6 illustrates a block diagram of the Software/Hardware (SW/HW) Architecture that is employed in, or interacts with, an integrated light/communicator module utilizing aspects of the present invention.

FIG. 6 illustrates a block diagram of the Software/Hardware (SW/HW) Architecture that is employed in, or interacts with, the integrated light/communicator module 200. Although previously described as being two different processors, 231 and 251, a single Central Processing Unit (CPU) 500 preferably performs previously described tasks for the two processors, 231 and 251. Likewise, although previously described as being two different memories, 232 and 252, preferably a system memory 501 preferably stores the program codes previously described as being stored in memories 232 and 252. In addition to storing program code for the processor 500, the memory 501 also stores critical system parameters and SDR parameters.

At the software application layer 510, the CPU 500 executes program code stored in the system memory 501 for communicating with other network nodes using a Network Protocol, for executing various Applications described herein, for running the Network Management System (NMS), for running a Power Management Unit (PMU) associated with the Power Conversion Unit 240 to provide intelligence to the Power Conversion Unit 240 as described herein, and for running a Light Controller as described herein.

At the physical layer 520, the CPU 500 interacts with, or implements functions of, circuit(s) which receive signals from the RF transceiver 233 to perform signal processing and Baseband Codec functions. At the physical layer 530, the CPU 500 interacts with, or implements functions of, circuit(s) which receive signals from, or interact with, the electric lamp 220, the power line 103, the other power sources 104 (including the emergency battery), and sensor(s) 253 to perform as electric lamp driving, voltage/current regulating, Voltage Reference (VREF) and voltage biasing (BIAS), Pulse Width Modulation (PWM) control, Under Voltage/Over Voltage (UV/OV) detection, and temperature detection.

The functionality of the integrated light/communicator module 200 can be modified or upgraded through software changes affected by commands sent over the wireless communication network or via signaling over the power line 103. This programmable functionality can also be used to modify the SDR as required to enhance network performance or perform within future regulatory or security requirements.

As an example of a wireless communication network, a wireless mesh network providing multi-hop communications is employed to implement a MANET that is self-configuring and self-managing. The Baseband processor 231 performs all functions necessary to serve as a relay node in the wireless communication network. Additional interface circuitry (not shown) may be provided on some of the integrated light/communicator modules to facilitate gateway connections (e.g., LTE, 802.11a/b/n, EVDO, etc.) to other network segments or services. Additional interface circuitry (not shown) may also be provided on some or all of the integrated light/communicator modules to facilitate an access point or a router or a relay. When deploying the wireless communication network, modules with this additional interface circuitry may be provided every so many hops, so that all nodes of the network may establish connections to those other network segments and/or services.

Figure 7:
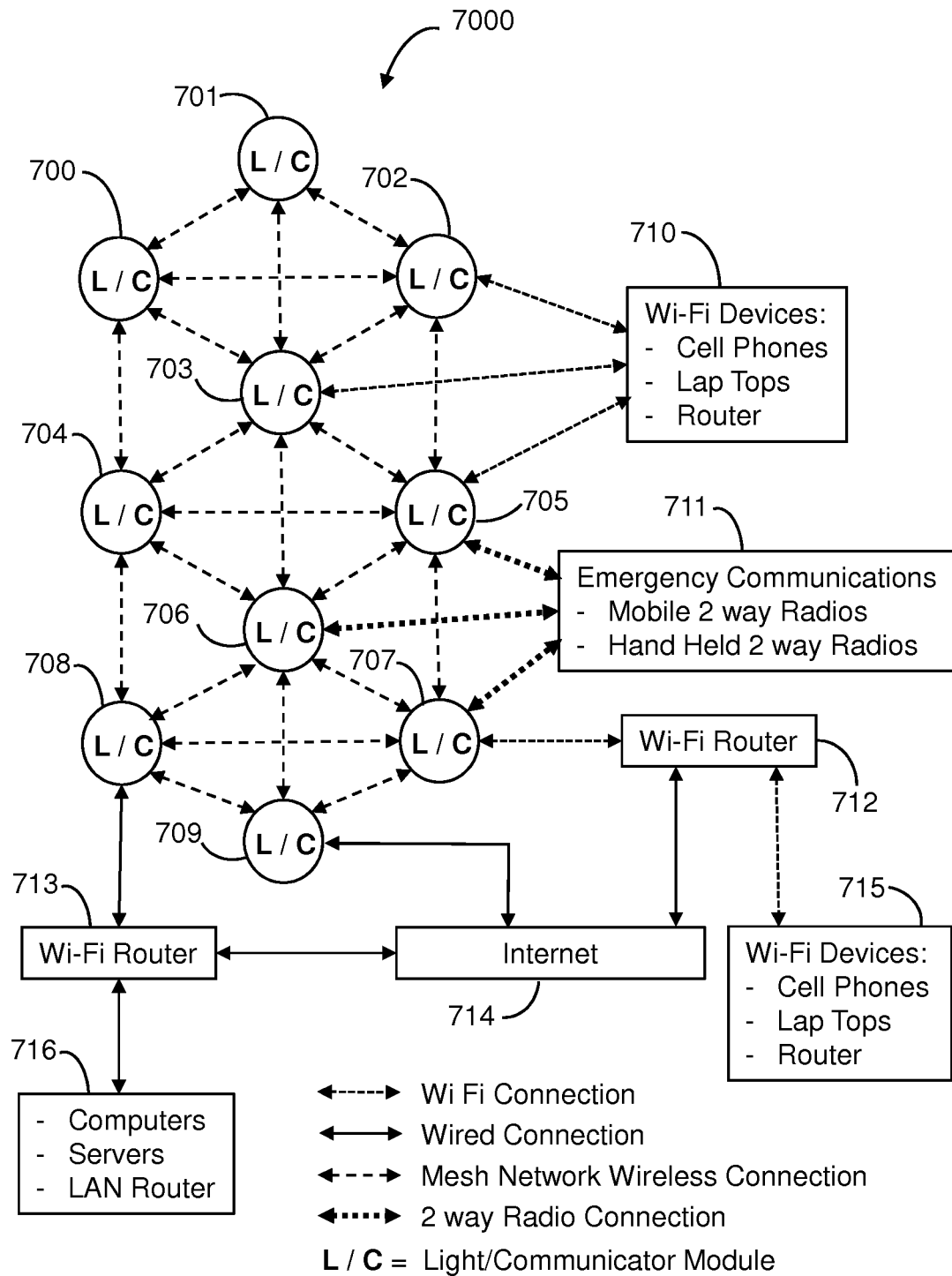
FIG. 7 illustrates a topology of a spatially distributed wireless communication network implemented by integrated light/communicator modules utilizing aspects of the present invention.

FIG. 7 shows, as a simple example, the topology of a spatially distributed mesh network 7000 which is implemented by ten light/communicator (L/C) modules 700 through 709. Each L/C module serves as a node of the mesh network 7000. Each L/C module, in this example, has a RF transmission radius so that it can communicate with its nearest neighboring L/C modules as shown in FIG. 7. Accordingly, as is illustrated by the exemplary mesh network 7000 shown in FIG. 7, each L/C module can have multiple mesh network wireless connections with multiple points of communication to a plurality of L/C modules. Redundant connections are provided so that a failure of a single or multiple nodes does not compromise the integrity of mesh network 7000. For example, if L/C modules 702, 703, and 704 fail, Wi-Fi devices 710 would still be able to connect to the internet 714 through L/C modules 705, 707, and 709, or alternately through L/C modules 705, 706, 708, and 709. As shown in FIG. 7, the mesh network 7000 can have multiple (redundant) connections to the internet 714. The L/C module 709 can make a direct connection to the internet 714. The L/C module 708 can make a connection to the internet 714 through router 713. The L/C module 708 can make a connection to the internet 714 through router 712. Accordingly, the possible routing combinations available with any given single or multiple module/node failure are numerous, thus making the mesh network 7000 very robust.

Although not shown for clarity, multiple instances of any of the mesh network peripheral devices 710 through 716 can connect to any of the L/C modules in the mesh network 7000. As shown in FIG. 7, Wi-Fi devices 710 can make bi-directional point to point Wi-Fi connections directly with the L/C modules for two-way (bi-directional) wireless communications. Alternately, Wi-Fi devices 715 can connect to the mesh network 7000 via a Wi-Fi router 712 for two-way (bi-directional) wireless communications. As shown in FIG. 7, the Wi-Fi devices 715 can make a bi-directional point to point Wi-Fi connections to the Wi-Fi router 712. The Wi-Fi router 712 can make a bi-directional point to point Wi-Fi connection to an L/C module 707 to provide for two-way (bi-directional) wireless communications between Wi-Fi devices 715 and the mesh network 7000.

As shown in FIG. 7, wired connections can also be made to the mesh network 7000. A Local Area Network (LAN) connection can be established directly to an L/C module such as shown between L/C module 708 and the router 713 through a wired connection where additional bandwidth or security is required. Network peripheral devices 716 (e.g., computers, servers, and LAN routers) can make a wired connection to the router 713. The router 713 can make a wired connection to the L/C module 708 to provide for two-way (e.g., bi-directional) communications between network peripheral devices 716 and the mesh network 7000. The mesh network 7000 can directly have a wired connection to the internet 714. The L/C module 709 has a wired connection to the internet 714 to provide for two-way (bi-directional) communications between the mesh network 7000 and the internet 714.

As shown in FIG. 7, emergency communications devices 711 can directly make two-way radio connections with the L/C modules (e.g., L/C modules 705, 706 and 707) in the mesh network 7000 to provide for two-way (e.g., bidirectional) communications between the mesh network and the emergency communication devices. The emergency communications devices 711 communicate directly with local L/C modules within range. The mesh network 7000 can extend the communication coverage of the emergency communications devices 711 to other emergency communication devices located elsewhere over the reach of the L/C modules in the entire mesh network. A direct wired connection between an LC module and the internet (e.g., L/C module 709 and the internet 714) can extend the communication coverage of emergency communications devices 711 to that over the Internet 714, beyond the reach of the L/C modules in the mesh network 7000.

To facilitate communications between nodes of the mesh network 7000, as part of a wireless communication network, a unique identification code is assigned to each integrated light/communicator module 200. The baseband processor 231 of the communicator unit 230 shown in FIGS. 2-3 can be assigned a unique identification code.

In addition to integrated light/communicator modules, other nodes of the wireless communication network may comprise mobile devices and/or stationary devices that have been adapted with RF transceivers and communicator modules to communicate on the wireless communication network. Examples of such mobile devices include walkie-talkies, cell phones, data cards, laptops, etc. As an example, MaxTech Networks Ltd. is a provider of technology that facilitates adaptation of standard mobile devices to perform as nodes in a wireless mesh network. Whereas such adapters are commonly implemented as hardware attachments to the mobile devices, the Baseband Processor of the integrated light/communicator module implements the node communication functions in SDR.

Figure 8:
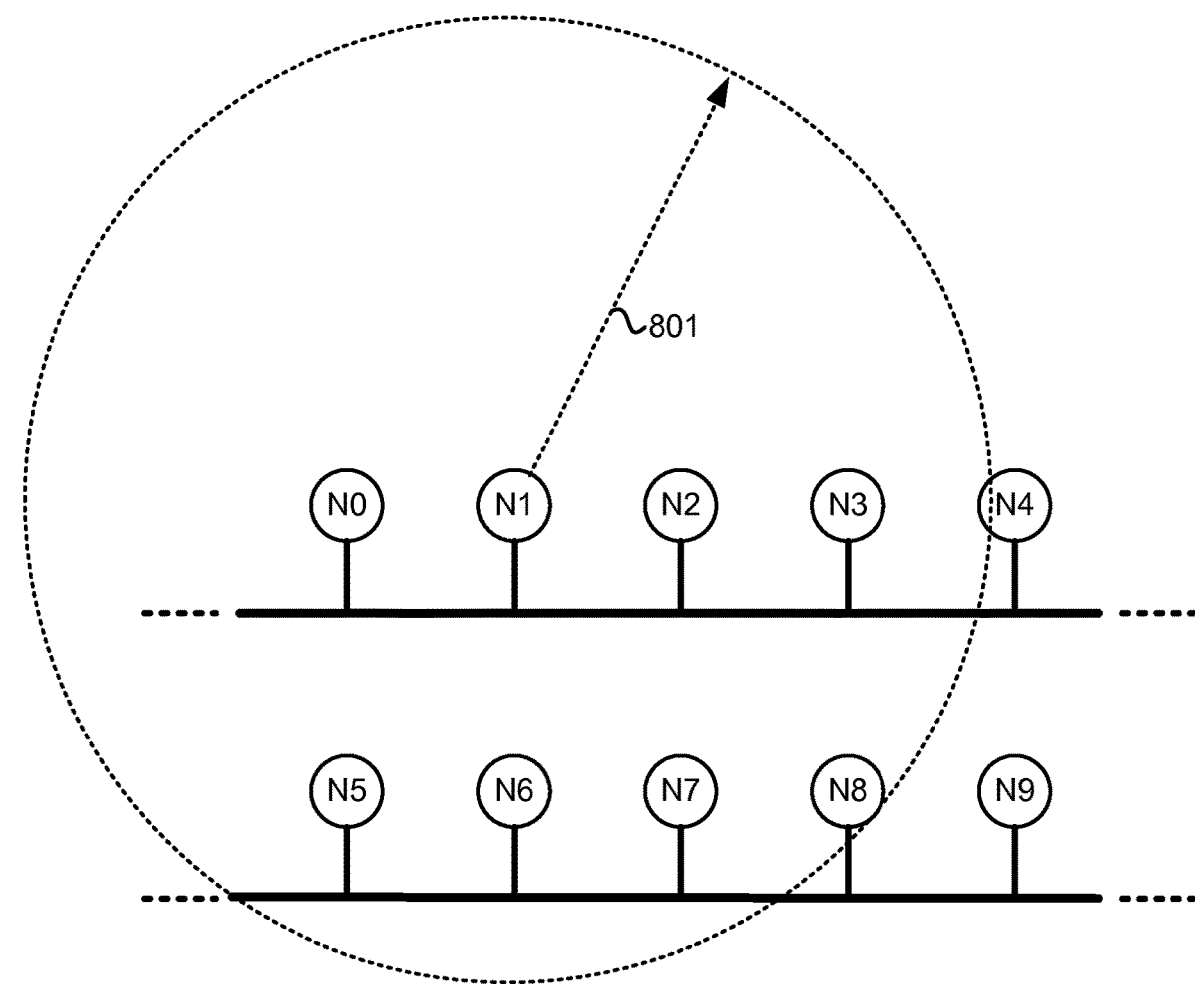
FIG. 8 illustrates a topology of a spatially distributed wireless communication network with an extended range RF transmission radius for an integrated light communicator module utilizing aspects of the present invention.

Although the example described in reference to FIG. 7 assumes that the RF transmission radius for each integrated light/communicator module only extends to an immediately adjacent light/communicator module, in other examples, the RF transmission radius may extend beyond just the immediately adjacent integrated light/communicator module. As shown in FIG. 8, the RF transmission radius 801 for an integrated light/communicator module identified as node N1 extends beyond its immediately adjacent light/communicator modules identified as nodes N0, N2, N5, N6, and N7, to also cover non-adjacent light communicator modules identified as nodes N3 and N8.

One example of a wireless communication network that may be deployed by retrofitting spatially distributed electric lamps with integrated light/communicator modules 200 is an emergency communication network providing mission-critical communications. Another example is a non-emergency communication network providing wireless private, public or commercial access, Internet access, VOIP, or a cellular network node. Still another example is a hybrid emergency/non-emergency communication network providing both mission-critical communications and wireless non-emergency access.

As may be readily appreciated, a network backbone for a wireless communication network may be deployed by retrofitting a grid of street lamps that are spatially distributed over a populated geographical area with integrated light/communicator modules 200. Each of the deployed integrated light/communicator modules 200 may then be used as an access point to the network backbone by properly adapted or equipped mobile and/or stationary devices. The electric lamp in this example is preferably a Light Emitting Diode (LED) lamp, which is more energy efficient than a conventionally used High Pressure Sodium (HPS) lamp.

As yet another application example, lighting devices may be spatially distributed throughout a commercial building or a private residence. In this case, the integrated light/communicator module 200 may include a lighting technology such as an incandescent bulb or fluorescent tube. Further, a more energy lighting technology may be provided in such modules, such as LED.

As one example for constructing the integrated light/communicator module 200, a System-on-Chip (SoC) approach may be used for large volume production. In this approach, circuitry for the communicator unit 230, power conversion unit 240, sensor unit 250, and interface 210 may be fabricated on a silicon chip. A housing is placed around the SoC and other components of the integrated light/communicator module 200 to protect them from the environment and/or unauthorized tampering. Security features are preferably provided so that any physical attack to the chip will trigger internal circuits to destroy the chip. The integrated light/communicator module 200 is preferably designed with a built-in security manager so that any unauthorized disassembly of the module's housing before disarming the security manager will cause the system to self-destruct.

As an alternative embodiment, a System-on-Board (SoB) approach may be used for small volume production. In this embodiment, various electrical components implementing the integrated light/communicator module 200 are soldered on a Printed Circuit Board (PCB). Data Communication may be connected to the PCB in a Module that is plugged into the PCB as a daughter board via a standard interface such as PCI, USB, etc., or Data Communication may be provided in SDR which is programmed into a microcontroller chip mounted on the PCB.

Optional features include the ability to remotely control both the lighting and data communication of the integrated light/communicator module 200 from a Network Management System (NMS).

Figure 10:
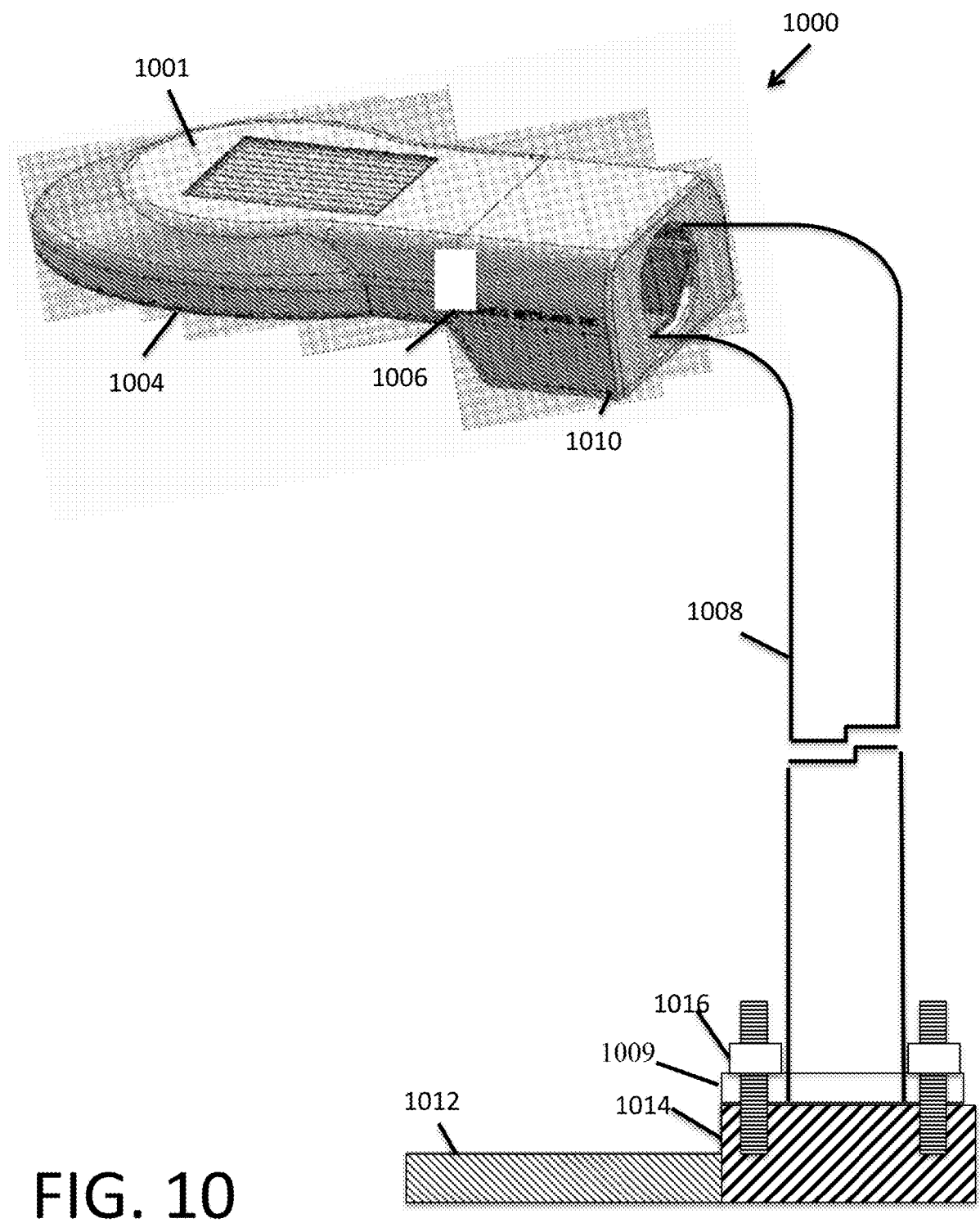
FIG. 10 illustrates a diagram of a street lamp including an integrated light/communicator module.

FIG. 10 illustrates a street lamp 1000 with an integrated lighting/communicator module 1001. The integrated lighting/communicator module 1001 includes a light emitting diode (LED) lamp 1004. The LED lamp 1004 is more energy efficient than a conventionally used high pressure sodium (HPS) lamp. The integrated lighting/communicator module 1001 couples to a socket 1006 of a pole 1008 supporting the lamp head 1010 over a street 1012. The pole 1008 of the street lamp 1000 is coupled to a surface of a material 1014 adjacent the street 1012 by a plurality of fasteners 1016, such as bolts or studs with nuts. Each of the nodes shown in the FIG. 8 and each L/C module shown in FIG. 7 may be an instantiation outdoors around a street of the street lamp 1000 with the integrated lighting/communicator module 1001.

Figure 9:
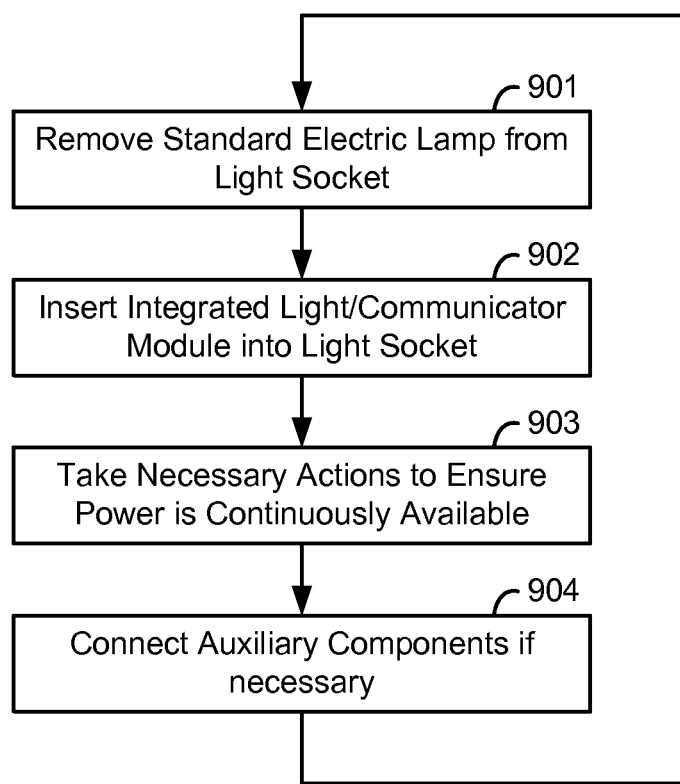
FIG. 9 illustrates a flow diagram of a method for deploying a spatially distributed wireless communication network by retrofitting spatially distributed electric lamps with integrated light/communicator modules utilizing aspects of the present invention.

FIG. 9 illustrates a method for deploying a spatially distributed wireless communication network by retrofitting spatially distributed electric lamps with integrated light/communicator modules. In block 901, a standard electric lamp is removed from a light socket and in block 902, the integrated light/communicator module 200 is inserted in its stead. In block 903, a daylight sensor or an on-off switch to the electric lamp is disabled, if necessary, so that power is available to the integrated light/communicator module 200 continuously. This may be as simple as covering the existing daylight sensor. The on-off function of the replacement light/communicator module 200 is preferably self-contained within the module 200 and can be controlled by a light sensor, timer, or via commands from the wireless network. In 904, auxiliary components such as a solar panel, battery, antenna, sensors, or passive components are connected to the light/communicator module 200 via terminals or connectors on the module, if required to do so. The integrated light/communicator module 200, once properly installed in the light socket, communicates with other integrated light/communicator modules within its RF transmission radius to join an existing wireless communication network or to establish a new one. The method then continues by jumping back to block 901 to loop through blocks 901-904 to deploy another integrated light/communicator module 200 in the established network.

Although the various aspects of the disclosed embodiments have been described with respect to the above examples, it will be understood that the embodiments are entitled to full protection within the full scope of the appended claims. In particular, although certain specific examples are described herein, the claimed scope of the disclosed embodiments is not to be limited to these specific examples. For example, disclosed aspects may also be used in wired communications, such as in the form of fiber repeaters, relays, switches, signal boosters, Ethernet, and various coax/twisted pair wires using various types of communication protocols. As another example, disclosed aspects may be used to support both wireless and wired communications, such as Fiber DAS which carries communications over a Fiber Optic Cable. As yet another example, disclosed aspects may be used in a Distributed Antenna System, LTE node and network, WiMax Node, Relay Node, or any type of communication protocol, proprietary or public.

What is claimed is:

1. A method for deploying a spatially distributed wireless communication network, the method comprising:
   removing a plurality of electric lamps from a corresponding plurality of light sockets;
   installing an integrated light/communicator module into each of the plurality of light sockets;
   wherein each integrated light/communicator module is adapted to replace the replaced electric lamp in form, fit, and lighting function,
   wherein each integrated light/communicator module is further adapted to wirelessly communicate with other integrated light/communicator modules by using a plurality of wireless communication network protocols,
   wherein each integrated light/communicator module is further adapted to capture humidity with a humidity sensor for weather tracking,
   wherein each integrated light/communicator module is further adapted to capture temperature with a temperature sensor for weather tracking, and
   wherein each integrated light/communicator module includes a global positioning system (GPS) sensor adapted to determine its position in the spatially distributed wireless communication network.

2. The method as in claim 1, wherein:
   the wireless communication network protocol is a wireless mesh network protocol that self-adaptively configures, and routes communications through, the spatially distributed wireless communication network.

3. The method as in claim 1, wherein:
   each integrated light/communicator module is further adapted to capture video with a camera sensor for weather tracking.

4. The method as in claim 1, wherein:
   each integrated light/communicator module is further adapted to capture vehicle traffic based on a traffic monitoring sensor.

5. The method as in claim 1, wherein:
   each integrated light/communicator module is further adapted for remote control to flash a light to alert persons nearby in the case of an emergency.

6. A method of manufacturing an integrated light/communicator module, the method comprising:
   mounting a replacement electric lamp on an interface, the interface adapted to be inserted in a light socket; and
   mounting a communicator unit on the interface, the communicator unit including
   a radio frequency (RF) transceiver adapted to communicate using radio frequency signals,
   a temperature sensor adapted to capture temperature for weather tracking,
   a humidity sensor adapted to capture humidity for weather tracking,
   a global positioning system (GPS) sensor adapted to determine its position in a spatially distributed wireless communication network, and a processor coupled to the RF transceiver, the temperature sensor, and the GPS sensor, the processor programmed to cooperatively establish a wireless communication network including other integrated light/communicator modules in the spatially distributed wireless network by communicating with the other integrated light/communicator modules through the RF transceiver.

7. The method as in claim 6, wherein the communicator unit further includes
a camera sensor adapted to capture video for weather tracking.

8. The method as in claim 6, wherein the communicator unit further includes
a traffic monitoring sensor to capture vehicle traffic.

9. The method as in claim 6, wherein the communicator unit further includes
a light responsive to remote control to flash the light to alert persons nearby in the case of an emergency.

10. A streetlamp adjacent a street, the streetlamp comprising:
a base configured to mount to a surface with a plurality of fasteners;
a pole having a first end and a second end, wherein the first end is coupled to the base;
a lamp head coupled to the second end of the pole, the lamp head including a socket; and
an integrated lamp and radio communication module coupled to the lamp head, the integrated lamp and radio communication module having
an interface inserted into the socket;
an electric lamp mounted on the interface; and
a communication unit mounted on the interface, the communication unit including
a radio frequency (RF) transceiver,
a temperature sensor adapted to capture temperature for weather tracking,
a humidity sensor adapted to capture humidity for weather tracking,
a global positioning system (GPS) sensor adapted to determine its position in a spatially distributed wireless communication network, and
a processor coupled to the RF transceiver, the temperature sensor, the humidity sensor, and the GPS sensor, the processor to execute program code to control the RF transceiver and communicate weather tracking information based on its position,
wherein the processor and RF transceiver are configured to cooperatively establish and participate in an outdoor wireless communication network with a plurality of street lamps having the integrated lamp and radio communication module around one or more streets.

11. The streetlamp of claim 10, wherein:
the communication unit further includes
a camera sensor adapted to capture video for weather tracking.

12. The streetlamp of claim 10, wherein:
the communication unit further includes
a traffic monitoring sensor to monitor vehicle traffic on the street over which the streetlamp is located.

13. The streetlamp of claim 10, wherein integrated lamp and radio communication module further comprises:
a power converter mounted on the interface, the power converter coupled to the communication unit, the electric lamp, the power conversion unit configured to receive a first power over a power line of the socket and convert the first power into a second power suitable for powering the electric lamp and the communication unit.

14. The streetlamp of claim 10, wherein
the program code executed by the processor is updated by signals received over a powerline through the interface.

15. The streetlamp of claim 10, wherein
the communication unit is coupled in communication with the internet; and
the processor and RF transceiver are configured to couple the outdoor wireless communication network to the internet.

16. The streetlamp of claim 15, wherein
the communication unit is configured as a Wi-Fi hotspot to provide internet access to Wi-Fi devices through the outdoor wireless communication network.

17. The streetlamp of claim 15, wherein
the communication unit is coupled in communication with one or more other communication units of other streetlamps along the street using radio frequency (RF) signals other than Wi-Fi.

* * * * *